UNITED STATES PATENT OFFICE.

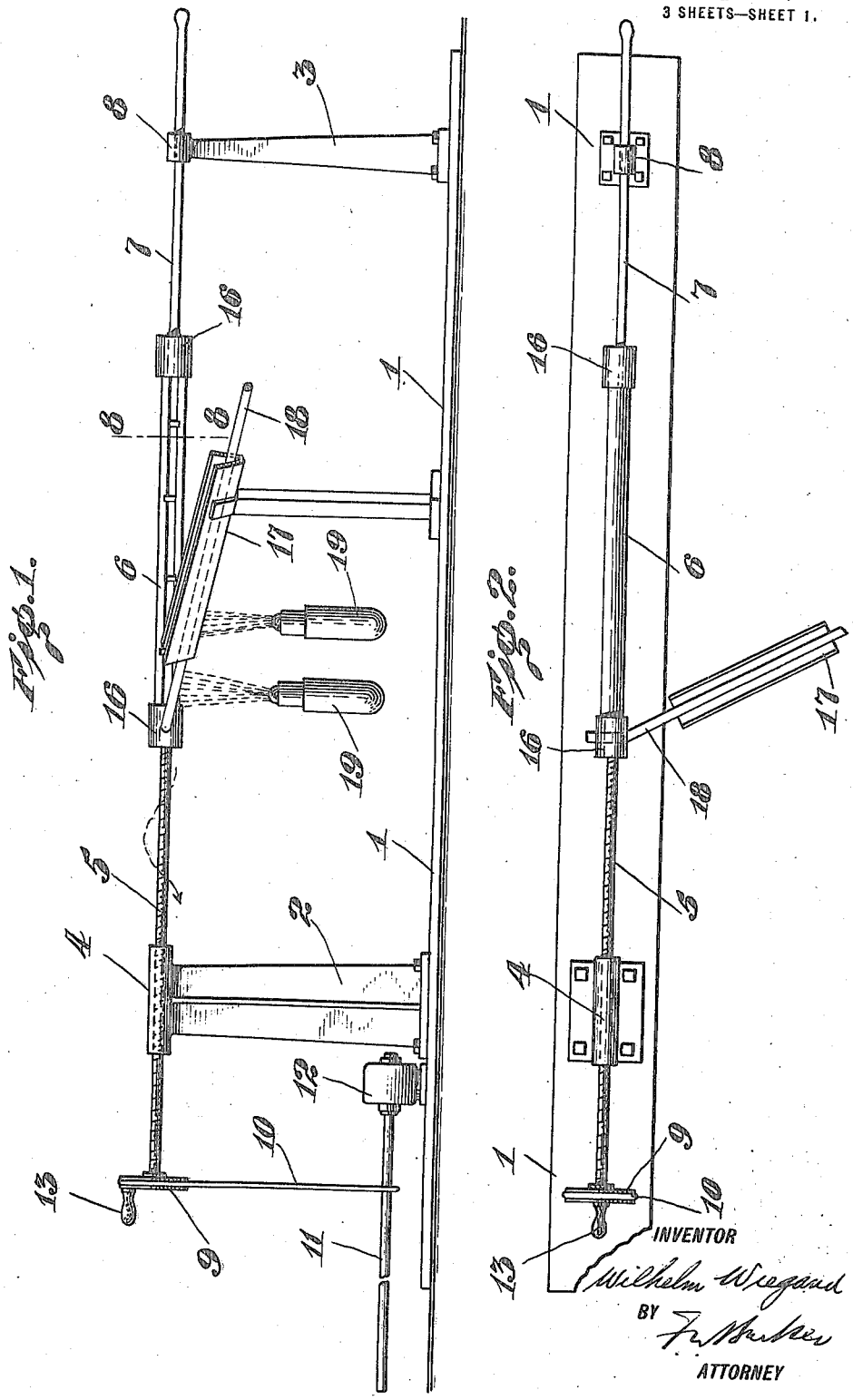

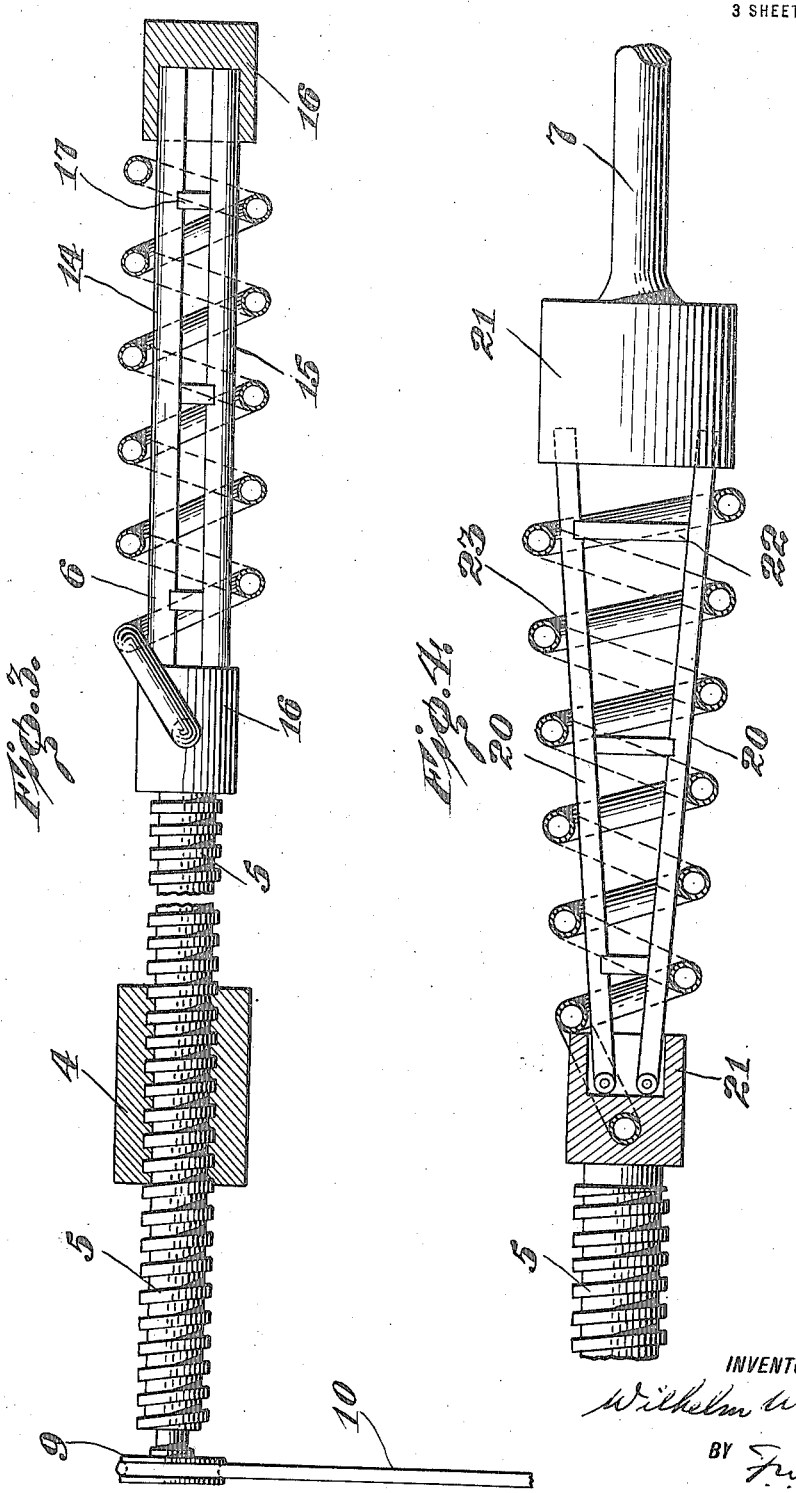

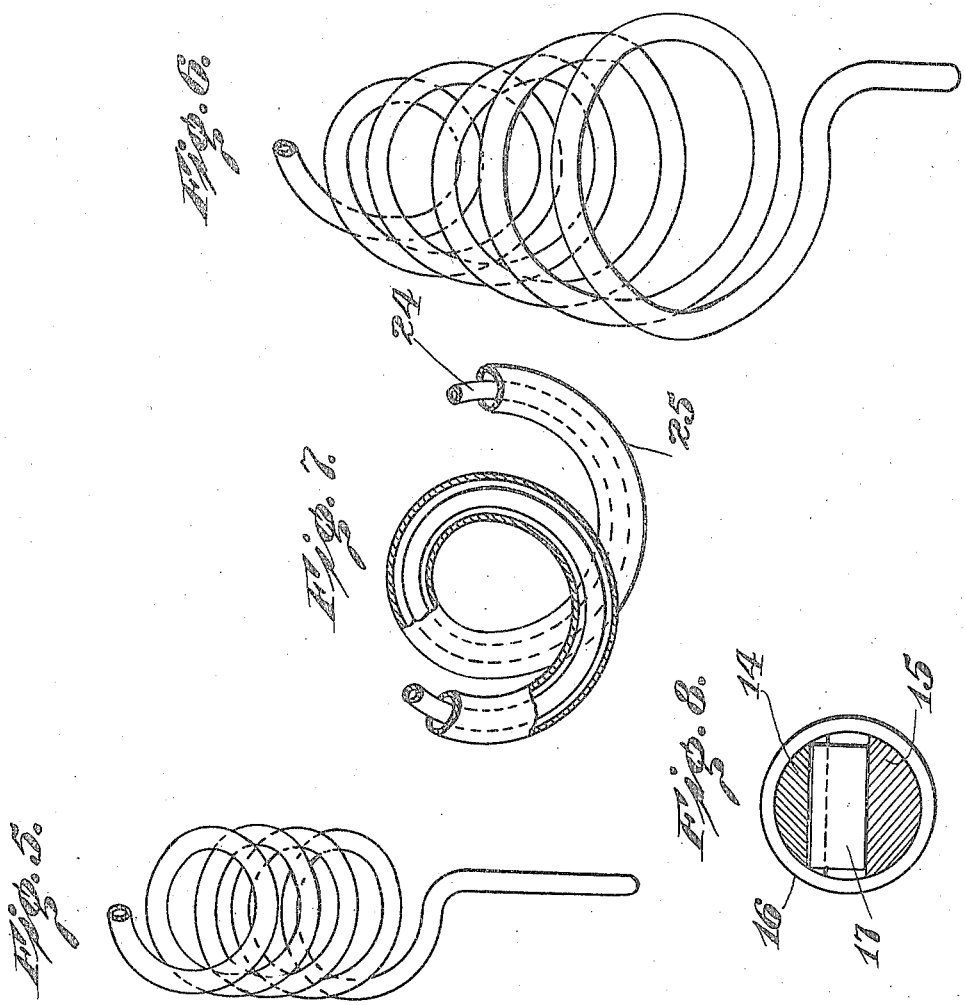

WILHELM WIEGAND, OF NEW YORK, N. Y., ASSIGNOR TO STUYVESANT GLASS CO., INC., A CORPORATION OF NEW YORK.

APPARATUS FOR SPIRALING GLASS.

1,264,355. Specification of Letters Patent. Patented Apr. 30, 1918.

Application filed April 20, 1917. Serial No. 163,336.

*To all whom it may concern:*

Be it known that I, WILHELM WIEGAND, a citizen of Germany and resident of the borough of Manhattan, in the city, county, and State of New York, have invented certain new and useful Improvements in Apparatus for Spiraling Glass, of which the following is a specification.

This invention relates to a new method and apparatus whereby frangible material, like glass tubes and rods, may be formed into spiral or other variations from a straight formation with precise regularity of bend, as for use in chemical and laboratory practice and the various scientific arts where apparatus including such devices is applicable.

Hitherto, the art of bending glass into convolutions has generally been carried out by hand labor, and artisans have become highly expert in this branch of glass working. Such attempts as have been made to employ machinery for this purpose have so far not succeeded, because of the frangible character of the material being treated, and the frequent resulting breakage.

A disadvantage of the manual form of bending operation has been that the spiral turns could not be produced evenly, with exact regularity, so that they would be instead variably spaced apart, notwithstanding the exercise of the greatest care and skill, at high expense for expert labor; and the finished product could not therefore possess the maximum degree of efficiency.

Therefore my invention comprehends mechanical means whereby a glass tube or rod may be advanced with constant or desirable speed through an apparatus in which it is given any desired consecutive spirals, following a set form, and having a uniform regularity which is not attainable through manual means.

The machine in brief may comprise a screw which is driven at desired speed, which rotates a mandrel of suitable cross-sectional shape, and upon which the tube or rod to be formed may be wound in synchronism with the progressive revolutions of the screw until the work is completed, the mandrel being of collapsible character, so that it may be easily removed from the interior of the spiral glass formation.

It should be understood that heat is applied to the glass tube or rod in progress toward the machine, in order that such tube or rod may be rendered ductile at the critical moment of its entering upon the bending operation.

Other features and advantages of my said invention will hereinafter appear.

Figure 1 is an elevation of my improved glass bending machine.

Fig. 2 is a top plan view thereof.

Fig. 3 is an enlarged detail, partly in section, showing the screw and mandrel for a cylindrical spiral.

Fig. 4 is a similar view showing a mandrel for creating a conical spiral.

Fig. 5 illustrates the product of the machine in the form of a cylindrical spiral.

Fig. 6 illustrates the product of the machine in the form of a conical spiral.

Fig. 7 shows a larger tube in which has been entered a smaller tube of corresponding cylindrical spiral form, and Fig. 8 is a transverse section of the mandrel, on the line 8—8 of Fig. 1.

In the example of apparatus illustrated, whereby my improved methods of shaping lengths of glass may be practised, let 1 indicate the machine base, upon which are mounted the standards 2, 3, standard 2 carrying an interiorly threaded, horizontal bearing 4, in which is engaged an extended screw 5, said screw being connected, at one end, with a mandrel 6, to revolve the latter while imparting axial progression thereof; and said mandrel having an end connecting rod 7, which is slidable in a bearing 8, carried by the standard 3.

The screw 5 may be rotated mechanically, as by a pulley 9, driven by belt 10, which may be shiftable along a power shaft 11, which receives its motion as from a motor 12. Or the pulley may be employed as a hand wheel through the use of a handle 13.

The mandrel 6 is of collapsible character, so that after serving its purpose as a mount or frame upon which the glass lengths are given their desired spiral form, it may be contracted to be thereby easily removable from within the spiral conformation.

In this manner the mandrel is readily removable without incurring any liability of damaging the material of the spiral formation, as would be the case if the mandrel were rigid and removed while in close frictional contact with the convolutions of the spiral. Therefore, I have shown the mandrel as composed of the opposed members 14, 15, which are lodged within recesses in the end cap portions 16, and spread apart by intervening blocks 17, which exert outward thrust to bind the members 14, 15, within said cap portions, and thus constituting a composite though demountable mandrel.

With the mandrel thus formed, the outer surface of the members 14, 15 being convexed to accord with the desired cylindrical contour of the spiral conformation which is to be formed thereover, the mandrel is in condition for use.

After the production of the spiral composed of glass, the mandrel may be collapsed or demounted by removing the blocks 17, whereupon the members 14, 15, may be conveniently disengaged from the hollow of the spiral, as is obvious.

The method of performing this spiraling operation is by directing a straight length of either tubing or rod to the mandrel, an end of such length being secured as to the cap portion 16, which may have an orifice for the reception of such end, and by maintaining the same direction for the length of glass, under softening temperature, while the mandrel is rotated by the screw, so that said length of glass becomes convolved upon the mandrel, with equi-spaced turns in synchronism with the revoluble and axial movement of the screw.

A channel or guide, as 17, is angularly supported relatively to the mandrel, substantially as shown, to support and direct the length of glass 18 to be spiraled, and one or more burners, as 19, are provided to direct heat upon said channel and that portion of the length 18, which is to be treated, so that a proper degree of ductility is given the material at the critical point, whereby, as the mandrel advances axially, the length 18 is drawn through the heat zone and caused to assume the desired spiral form in contact with and upon the surface of the mandrel.

Naturally, the speed of axial progression of the mandrel is rendered concomitant with the screw action through changing, by heat, the rigid character of the length 18, into the desired ductile character, so that the convolving operation, with respect to the length 18, is continuous, progressive, and practised with uniform regularity, in synchronism with the pitch of the screw, giving the finished product an accurately spaced spiral, cylindrical conformation.

The length of the spiral cylinder thus produced is regulated by the extent of the apparatus and of the tube or rod treated.

The spiral formation is not limited to cylindrical form, but may be of any other desirable character, according to the shape of the mandrel employed. By way of example, I have illustrated, in Fig. 4, a mandrel for the production of conical spirals, said mandrel, composed of the members 20, which are here shown as pivotally connected to the cap portion 21, so that they may be separated at suitable angles, their opposite ends being engaged in the opposite cap portion 21ᵃ, they being held apart by the struts 22; the mandrel in this instance being demountable in the same manner as with the cylindrical mandrel.

It is of course perfectly obvious that the mandrel employed may have the form of a double cone; or, in fact have any competent shape which can thereby be accorded a glass length by winding the latter thereover.

In Fig. 5 I have shown a formed cylindrical spiral, and in Fig. 6 a formed conical spiral.

So accurately can the spiral bends be produced by my improved mechanical method, that, as shown in Fig. 7, a spiral tube 24 of small sectional area can be inserted within a larger spiral tube 25.

It will be understood that by the term glass used in this specification and claims, I intend to include all materials of like nature, such for instance as fused quartz, fused silica, etc.

Variations may be resorted to within the spirit and scope of my said invention, and parts thereof used without others.

I claim:—

1. A machine for forming lengths of glass into spirals, comprising a mandrel, means for imparting axially progressive, revoluble movement to said mandrel, stationary means to guide a glass length to said mandrel, and localized heating means to render ductile that portion of the glass length feeding from the guide means to the mandrel.

2. The combination, with a machine for spiraling lengths of glass, of a mandrel composed of expansible and contractible members, and means for holding said members expanded in angular relation to each other, to permit the formation of conical spirals.

Signed at the borough of Manhattan, in the city, county, and State of New York, this 14th day of April, A. D. 1917.

WILHELM WIEGAND.

Witnesses:
F. W. MARKER,
L. MOSKOWITZ.